(12) United States Patent
Chamberlain et al.

(10) Patent No.: US 8,917,964 B2
(45) Date of Patent: Dec. 23, 2014

(54) COMPOSITE COMMUNICATIONS CABLES HAVING A FIBER OPTIC COMPONENT LOCATED ADJACENT AN OUTER SURFACE OF THE CENTRAL CONDUCTOR OF A COAXIAL CABLE COMPONENT AND RELATED METHODS

(75) Inventors: John Charles Chamberlain, Hickory, NC (US); Douglas Blew, Mooresville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 181 days.

(21) Appl. No.: 13/523,185

(22) Filed: Jun. 14, 2012

(65) Prior Publication Data

US 2013/0336623 A1    Dec. 19, 2013

(51) Int. Cl.
*G02B 6/44* (2006.01)

(52) U.S. Cl.
USPC .......................................................... 385/101

(58) Field of Classification Search
USPC .......................................................... 385/101
See application file for complete search history.

(56) References Cited

U.S. PATENT DOCUMENTS

| | | | |
|---|---|---|---|
| 4,118,594 A | 10/1978 | Arnaud | |
| 4,158,478 A | 6/1979 | D'Auria et al. | |
| 4,416,508 A | 11/1983 | Dey et al. | |
| 4,695,127 A * | 9/1987 | Ohlhaber et al. | 385/101 |
| 4,723,832 A | 2/1988 | Okazato et al. | |
| 4,763,981 A | 8/1988 | Wilkins | |
| 5,125,062 A | 6/1992 | Marlier et al. | |
| 5,150,442 A | 9/1992 | Desmons | |
| 5,189,718 A | 2/1993 | Barrett et al. | |
| 5,222,173 A | 6/1993 | Bausch | |
| 5,268,971 A | 12/1993 | Nilsson et al. | |
| 5,293,678 A | 3/1994 | Chamberlain et al. | |
| 5,371,823 A | 12/1994 | Barrett et al. | |
| 5,418,878 A * | 5/1995 | Sass et al. | 385/101 |
| 5,467,420 A | 11/1995 | Rohrmann et al. | |
| 5,468,913 A | 11/1995 | Seaman et al. | |
| 5,473,715 A | 12/1995 | Schofield et al. | |
| 5,555,338 A | 9/1996 | Haag et al. | |
| 5,557,698 A | 9/1996 | Gareis et al. | |
| 5,574,815 A | 11/1996 | Kneeland | |
| 5,745,627 A | 4/1998 | Arroyo et al. | |
| 5,777,260 A | 7/1998 | Klumps et al. | |
| 6,343,172 B1 * | 1/2002 | Schiestle et al. | 385/101 |
| 6,859,590 B1 | 2/2005 | Zaccone et al. | |
| 7,200,305 B2 | 4/2007 | Dion et al. | |
| 8,041,165 B2 * | 10/2011 | Neuroth et al. | 385/101 |
| 8,204,348 B2 * | 6/2012 | Keller et al. | 385/101 |
| 2007/0098338 A1 * | 5/2007 | Mumm et al. | 385/100 |
| 2007/0189679 A1 * | 8/2007 | Stahulak et al. | 385/101 |
| 2010/0329614 A1 * | 12/2010 | Keller et al. | 385/101 |

OTHER PUBLICATIONS

Mexican Office Action Corresponding to Mexican Patent Application No. MX/a/2013/006772; Dated: Aug. 8, 2014; Foreign Text, 3 pages, English Translation Thereof, 3 Pages.

* cited by examiner

*Primary Examiner* — Sung Pak
(74) *Attorney, Agent, or Firm* — Myers Bigel Sibley & Sajovec, P.A.

(57) ABSTRACT

Composite communications cable are provided that include a central conductor, a dielectric spacer that substantially surrounds the central conductor, an outer conductor that substantially surrounds the dielectric spacer, a jacket that surrounds the outer conductor and a non-buffered optical fiber positioned between the central conductor and the dielectric spacer. An outer surface of the non-buffered optical fiber is within 50 microns of the outer surface of the central conductor. The positioning of the optical fiber adjacent an outer surface of the central conductor may protect the optical fiber from damage.

21 Claims, 6 Drawing Sheets

COMPOSITE COMMUNICATIONS CABLES HAVING A FIBER OPTIC COMPONENT LOCATED ADJACENT AN OUTER SURFACE OF THE CENTRAL CONDUCTOR OF A COAXIAL CABLE COMPONENT AND RELATED METHODS

FIELD OF THE INVENTION

The present invention relates to composite communications cables and, more particularly, to composite communications cables that include a coaxial transmission component and a fiber optic transmission component.

BACKGROUND

Figure 1:
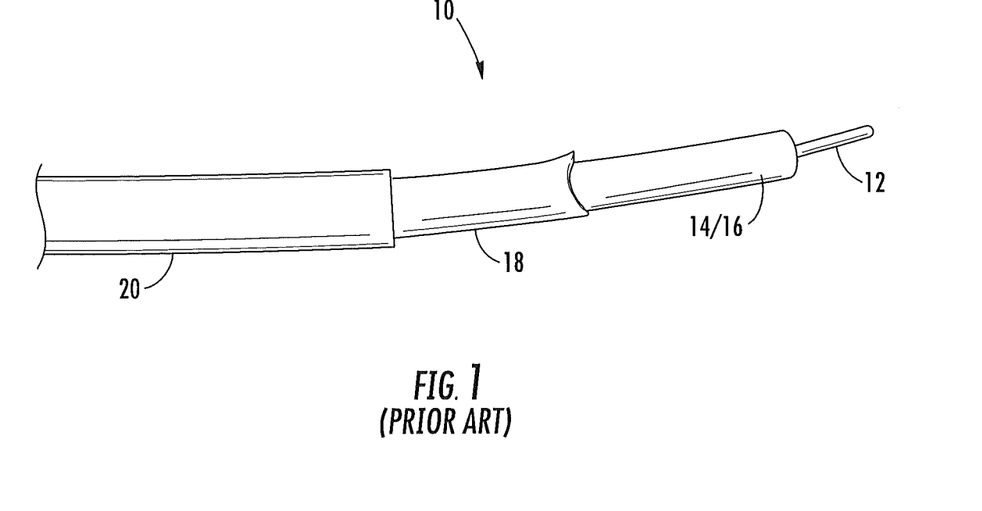
FIG. 1 is a perspective, partially cut-away view of a conventional coaxial cable.

Coaxial cables are a known type of electrical cable that may be used to carry radio frequency ("RF") signals. Coaxial cables are widely used as transmission lines in cable television networks. FIG. 1 is a schematic perspective view of a conventional coaxial cable 10 that has been partially cut apart to reveal its internal structure. As shown in FIG. 1, the coaxial cable 10 has a central conductor 12 that is surrounded by a dielectric spacer 14. A tape 16 may be bonded to the outside surface of the dielectric spacer 14. A metallic electrical shield 18, which typically comprises braided shielding wires and, optionally, one or more electrical shielding tapes (not shown in FIG. 1), surrounds the central conductor 12, dielectric spacer 14 and tape 16. The electrical shield 18 serves as an outer conductor of the coaxial cable 10. Finally, a cable jacket 20 surrounds the electrical shield 18 to complete the coaxial cable 10.

Figure 2:
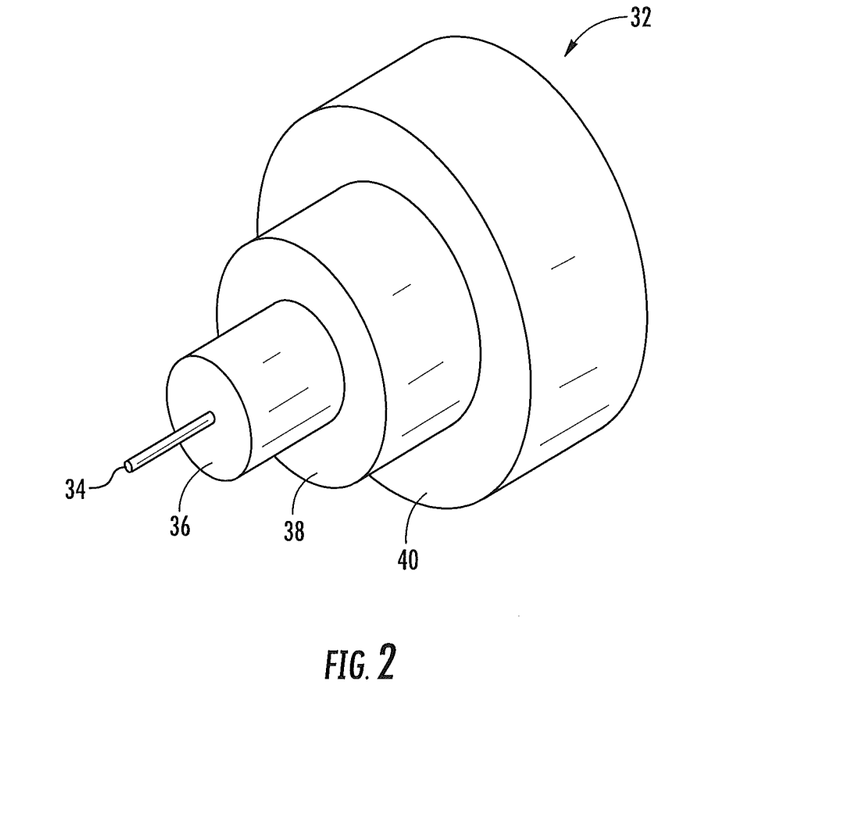
FIG. 2 is a transverse cross-sectional view of a conventional fiber optic communications cable.

Fiber optic cables are also well known in the art. Fiber optic cables typically include one or more optical fibers, one or more strength members such as, for example, aramid fibers or other strength yarns, and a protective outer jacket. FIG. 2 is a cross-sectional view of a conventional fiber optic cable 32. As shown in FIG. 2, the fiber optic cable 32 includes a glass (silica) core 34, a glass cladding 36, and a protective coating 38 that is typically a polymer layer such as an acrylic or other plastic layer that is integral with the core 34 and cladding 36. A jacket 40 surrounds and protects the optical fiber 32. While not shown in FIG. 2, it will be appreciated that additional components are routinely included in fiber optic cables such as strength yarns, buffer tubes additional optical fibers, etc. A wide variety of fiber optic communications cables are known in the art, including ribbon cables, loose tube cables, cables that include a single optical fiber, cables that include multiple optical fibers, etc.

Cable television networks refer to communications networks that are used to transmit cable television signals and signals relating to other services such as broadband Internet and/or Voice-over-Internet Protocol ("VoIP") telephone service between a service provider and a plurality of subscribers. Typically, the service provider is a cable television company that may have exclusive rights to offer cable television services in a particular geographic area. The subscribers in a cable television network may include, for example, individual homes, apartments, hotels, businesses, schools, government facilities and various other entities.

Most conventional cable television networks comprise hybrid fiber-coaxial networks. In these networks, fiber optic cables are typically used to carry signals from the headend facilities of the service provider to various distribution points. These fiber optic cables may support very high bandwidth communications, and thus may provide an efficient mechanism for distributing signals throughout a service area. However, fiber optic cabling and the related equipment that are used to transmit optical signals can be substantially more expensive than coaxial cable and the related equipment that is used to transmit electrical RF signals throughout a cable television network. Consequently, less expensive coaxial cable is typically used at least in the so-called "drop" sections of a cable television network in order to carry the signals into neighborhoods and/or into individual homes, apartment complexes, businesses and other subscriber premises. Electronic interface units are located throughout the cable television networks that are used convert the optical signals into electrical signals and vice versa.

SUMMARY

Pursuant to embodiments of the present invention, composite communications cables are provided that include a central conductor, a dielectric spacer that substantially surrounds the central conductor, an outer conductor that substantially surrounds the dielectric spacer, a jacket that surrounds the outer conductor and a non-buffered optical fiber positioned between the central conductor and the dielectric spacer. An outer surface of the non-buffered optical fiber is within 50 microns of the outer surface of the central conductor.

In some embodiments, the non-buffered optical fiber directly may contact an outside surface of the central conductor. The non-buffered optical fiber may extend, for example, parallel to the central conductor or may be helically wound around the central conductor. If helically wound, the optical fiber may be wound in a single direction or may be wound to have both clockwise and counterclockwise wound sections. The optical fiber may have a glass core or a plastic core. Plastic core optical fibers may more closely match the dielectric constant of the dielectric spacer (as compared to glass core fiber), which may reduce the affect of the inclusion of the optical fiber on transmission qualities of the coaxial cable. State of the art coaxial cable dielectric constants are, for example, approximately 1.25, whereas glass optical fibers may have a dielectric constant of, for example, about 3.8, and plastic optical fibers may have a dielectric constant of, for example, about 2.4-3.0.

In some embodiments, a stripping agent may be included between the central conductor and the non-buffered optical fiber. A central axis of the non-buffered optical fiber may be within 200 microns of an outer surface of the central conductor. The composite communications cable may also include a coaxial connector on at least one end thereof that covers and blocks access to an end of the non-buffered optical fiber. The composite communications cable may further a second non-buffered optical fiber that is positioned between the central conductor and the dielectric spacer, where an outer surface of the second non-buffered optical fiber is within 50 microns of the outer surface of the central conductor.

Pursuant to further embodiments of the present invention, composite communications cables are provided that include a central conductor, an outer conductor, a dielectric spacer that is between the central conductor and the outer conductor, and a tightly-buffered optical fiber that has a central core, a cladding layer concentrically surrounding the core, a polymer layer concentrically surrounding the cladding layer, and an outer plastic layer concentrically surrounding the polymer layer and joined to the polymer layer. A central axis of the optical fiber is within 450 microns of an outer surface of the central conductor.

In some embodiments, an outer surface of the tightly-buffered optical fiber may be within 50 microns of the outer surface of the central conductor. The tightly-buffered optical fiber may directly contact an outside surface of the central conductor. The tightly-buffered optical fiber may run parallel to the central conductor or may be helically wound around the central conductor.

In some embodiments, the core of the tightly-buffered optical fiber may be a plastic core. The composite communications cable may also include a stripping agent that is between the central conductor and the tightly-buffered optical fiber. The composite communications cable may further include a second tightly-buffered optical fiber that is positioned between the central conductor and the dielectric spacer, where an outer surface of the second tightly-buffered optical fiber is within 50 microns of the outer surface of the central conductor. Moreover, the composite communications may include a coaxial connector on at least one end thereof that covers and blocks access to an end of the tightly-buffered optical fiber.

DETAILED DESCRIPTION

The present invention is described more fully hereinafter with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

With the proliferation of the number of cable television channels that are typically offered and the ever-expanding use of the Internet, the bandwidth requirements of individual cable television and broadband Internet subscribers has increased significantly over the last decade. In order to provide high-speed Internet connectivity and other bandwidth intensive services to individual subscribers, there has been considerable interest in so-called "fiber-to-the-home" or "FTTH" deployments in which the signals from the service provider are carried as optical signals all the way to each individual subscriber premise, where the signals are (typically) converted to electrical RF signals for distribution within the subscriber premise to one or more end devices such as television sets, cable boxes, cable modems and the like.

Unfortunately, to date it has been found that fiber-to-the-home deployments are not economically feasible, as most consumers are unwilling to pay the substantial increase in monthly fees that would be required to support the increased cost of deploying optical fibers all the way to individual subscriber premises. Currently, the primary cost issue is the optical-to-electronic interface unit, which is typically referred to as a "node" when deployed within a hybrid fiber-coaxial network and is often referred to as a micro-node or network interface unit when deployed within individual subscriber premises (e.g., homes).

While fiber-to-the-home service is not currently economically feasible for most cable television service providers, it may become so in the future as the bandwidth requirements of individual subscribers increase and/or as the cost of fiber optic cabling and equipment decreases as compared to coaxial cable and equipment. However, if and when such changes occur, it may be cost prohibitive to retrofit existing cable television networks to have fiber-to-the-home deployments as the cost of reinstalling the cabling may far exceed the cost of the additional fiber optic cabling and equipment that would be necessary for a fiber-to-the-home deployment.

Pursuant to embodiments of the present invention, composite communications cables are provided that include both a coaxial transmission component and a fiber optic transmission component within a single cable structure. The composite communications cables according to embodiments of the present invention may be deployed as, for example, drop cables in both existing cable television networks (e.g., when those networks are expanded to include new neighborhoods and/or when existing drop cables are replaced as part of routine maintenance or repair operations) and in new cable television networks. The composite cables according to embodiments of the present invention may be installed in these networks using conventional coaxial connectors and may be operated initially as coaxial cables, with the optical fibers that are embedded in the cables remaining unused. Later, if and when fiber-to-the-home becomes economically feasible (either for an individual subscriber or for the entire network), an optical network unit may be installed at, for example, the subscriber premise, the coaxial connector can be removed from the cable, the coaxial cable components of the composite cable can be stripped back to expose the optical fiber(s), and the optical fiber(s) may be connected to the optical network unit to provide a high bandwidth fiber optic connection directly to the subscriber premise. In this manner, a cable television service provider may—for a relatively small price increase now—significantly reduce the cost of deploying fiber-to-the-home in the future. It will likewise be appreciated that the composite communications cables according to embodiments of the present invention may also be used in other hybrid fiber-coaxial networks other than cable television networks.

As is known to those of skill in the art, optical fibers include a glass core that may be easily damaged if the cable is bent at too tight of an angle or otherwise subjected to excessive force. Generally speaking, optical fibers are much more susceptible to damage than are the components of a coaxial cable. Accordingly, fiber optic cable routinely include strength members such as fiberglass or aramid fibers that protect the optical fibers, and often also include protective buffer tubes which both protect the optical fibers and may allow the optical fibers to move relative to the other components of the cable. Optical fibers that can move relative to the buffer tube are referred to as "loosely-buffered" optical fibers. So-called "tightly-buffered" optical fibers are also known in the art. These tightly-buffered optical fibers typically comprise a plastic material that is extruded directly onto the optical fiber (e.g., onto an acrylate coating of the optical fiber) such that the buffer layer is bonded to the optical fiber and forms an integral structure with the optical fiber. The buffer layer that is provided on a tightly-buffered optical fiber is typically about 250-325 microns thick, and the overall diameter of a tightly-buffered optical fiber (including the buffer layer) may be, for example, about 900 microns.

A number of composite communications cables have been proposed in the art. By way of example, U.S. Pat. Nos. 5,150, 442, 5,467,420 and 5,293,678 disclose composite coaxial/fiber optic communications cables that hollow out the central conductor of the coaxial cable to allow one or more optical fibers to be installed within the interior of the central conductor. Unfortunately, however, the use of a hollow central conductor increases the manufacturing costs for the cable, and the hollow central conductor (which must still be sized to work with conventional coaxial connector ports) may not be sufficiently robust and hence susceptible to damage. Running the optical fibers within a hollow central conductor of the coaxial cable may also make the coaxial and/or fiber optic connectorization process more difficult.

As another example, U.S. Pat. Nos. 5,745,627, 6,343,172 and 5,468,913 disclose composite coaxial/fiber optic communications cables that embed one or more optical fibers in a central region or outside edge of the dielectric insulator of a coaxial transmission component and/or outside the outer conductor of the coaxial transmission component. In these locations, the optical fibers may experience higher levels of stress in response to, for example, the bending of the cable, and hence buffered optical fibers are typically used and/or the optical fibers are loosely positioned in channels within the dielectric insulator. The use of such buffering/channels may increase the manufacturing costs for the composite communications cable. Moreover, even with these precautions, optical fibers may still be susceptible to damage when positioned close to the outer conductor of the coaxial transmission component. Accordingly, composite communications cables that include both a coaxial transmission component and a fiber optic transmission component have not routinely been deployed to facilitate subsequently upgrading a cable television network to have fiber-to-the-home capability.

The composite communications cables according to embodiments of the present invention position one or more optical fibers just outside the central conductor of, for example, a conventional coaxial cable. By way of example, in some embodiments, an outer surface of the optical fiber(s) may be in direct contact with an outer surface of the central conductor and/or may be within 50 microns of the outer surface of the central conductor. It has been discovered that by placing the optical fiber(s) in this location, the bending stresses and strains that the optical fibers may experience at the industry specified coaxial cable bend radius may be kept within industry acceptable levels, even when unbuffered and/or tightly buffered optical fibers are used. Moreover, positioning the optical fiber(s) to be in direct or near direct contact with the central conductor may simplify manufacturing by, for example, eliminating any need to form channels in the dielectric spacer.

Embodiments of the present invention will now be described with reference to the drawings.

Figure 3:
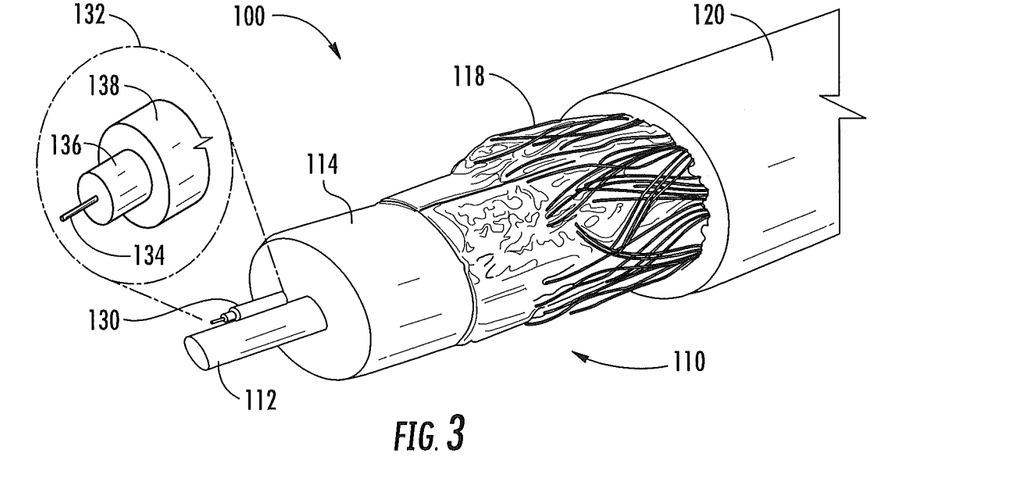
FIG. 3 is a perspective, partially cut-away view of a composite communications cable according to embodiments of the present invention.
Figure 4:
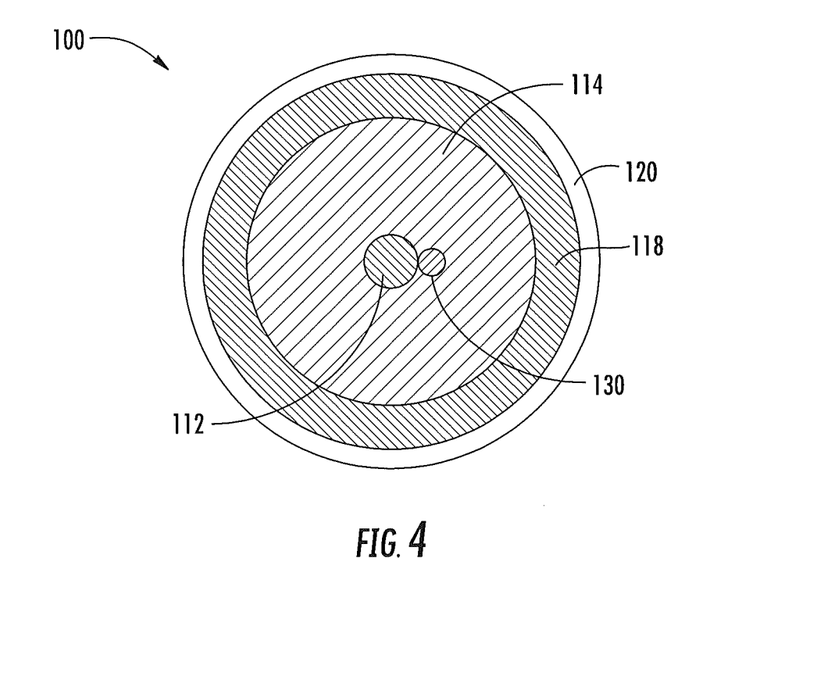
FIG. 4 is a transverse cross-sectional view of the composite communications cable of FIG. 3.

FIG. 3 is a perspective, partially cut-away view of a composite communications cable 100 according to embodiments of the present invention. FIG. 4 is a transverse cross-sectional view of the composite communications cable 100 of FIG. 3.

As shown in FIGS. 3 and 4, the composite communications cable 100 may extend in a "longitudinal" direction (which may also be referred to herein as an "axial" direction), and may have a generally round transverse cross-section. The cable 100 includes a central conductor 112 that is surrounded by a dielectric spacer 114. A metallic electrical shield 118, which may comprise a plurality of braided shielding wires, surrounds the dielectric spacer 114. A cable jacket 120 surrounds the electrical shield 118. The central conductor 112, dielectric spacer 114 and electrical shield 118 together comprise a coaxial transmission component 110 of composite cable 100.

The central conductor 112 may comprise, for example, a copper or copper alloy wire of suitable gauge (e.g., 18 gauge) or a copper or copper alloy-plated aluminum or steel wire. Other conductive materials may also be used to form the central conductor. The dielectric spacer 114 may be a any suitable insulative material including, for example, polytetrafluoroethylene ("PTFE") or polyethylene. The dielectric constant of the dielectric spacer 114 may be selected in view of, for example, the radii of the central conductor 112 and the electrical shield 118 to provide a characteristic impedance of 75 ohms. In some embodiments, the dielectric spacer 114 may be applied as a foam that cures to form a solid that surrounds the central conductor 112. The electrical shield 118 may comprise, for example, braided copper wire. A conductive tape (not shown) may be bonded to an outside surface of the dielectric spacer 114, and one or more electrical shielding tapes (not shown) may surround the electrical shield 118.

The composite communications cable 100 further includes a fiber optic transmission component 130. In the embodiment of FIGS. 3 and 4, this fiber optic transmission component 130 comprises a non-buffered optical fiber 132 (which is also sometimes referred to as a "bare" optical fiber) that is positioned just outside the central conductor 112. As shown in the call-out included in FIG. 3, the optical fiber 132 includes a core 134 and a surrounding cladding 136. The core and cladding 134, 136 may be constructed in any suitable manner. For example, each of the core 134 and cladding 136 may include one or more concentric segments or layers, may be doped, etc. The core and cladding 134, 136 may be formed of any suitable materials and using any suitable methods. In some embodiments, the core and cladding 134, 136 may comprise a glass core and cladding 134, 136. In other embodiments, the core and cladding 134, 136 may comprise a plastic core and cladding 134, 136. Other suitable materials may also be used to form the core and/or cladding 134, 136.

The non-buffered optical fiber 132 further includes a coating layer 138 that surrounds the cladding 136. The coating layer 138 provides environmental protection for the core 134 and cladding 136 and may comprise, for example, a polymer layer. In the illustrated embodiment, the coating layer 138 consists of a single coating layer; however, multiple concentric layers may be applied to form the overall coating 138. According to some embodiments, the coating layer 138 may comprise an ultra-violet light-cured acrylate. In some embodiments, the overall diameter of the optical fiber 132 may be in the range of from about 235 to about 265 µm. According to some embodiments, the thickness of the coating layer 138 is no greater than about 70.5 µm. According to some embodiments, the diameter of the core 134 is between about 6 and about 64 μm and the thickness of the cladding 136 is between about 115 and about 135 μm. As shown in FIGS. 3 and 4, the optical fiber 132 may extend parallel to the central conductor 112 and may be in direct contact with the central conductor 112.

As is further shown in FIGS. 3 and 4, the coaxial transmission component 110 and the fiber optic transmission component 130 may both be encased within a protective jacket 120. The jacket 120 may be formed of any suitable material such as a polymeric material. According to some embodiments, the jacket 120 is formed of a thermoplastic polymer. Suitable polymeric materials may include, without limitation, PVC, PVDF or FRPE. The jacket 120 may be molded or extruded over the outer conductor 118 of the coaxial cable component 110. Suitable apparatus and methods for forming the composite communications cable 100 will be apparent to those of skill in the art.

Typically, the optical fiber 132 will have a dielectric constant that is different than the dielectric constant of the dielectric spacer 114. If only one (or a few) optical fibers 132 are included in the cable 100, then the dielectric constant for the portion of the coaxial transmission component that includes the embedded optical fiber(s) will typically be different than the dielectric constant that will provide a 75 ohm characteristic impedance due to the inclusion of the optical fiber 132 having the different dielectric constant. Test results on one example embodiment that included an optical component that consisted of a single non-buffered optical fiber have shown that this deviation from an ideal characteristic impedance can result in an additional loss of about 3 dB per 100 feet of cable for a 1 GHz communications signal. In some embodiments, this attenuation loss may be reduced by using a plastic optical fiber instead of a glass optical fiber that has a dielectric constant that is more closely matched to the dielectric constant of the dielectric spacer 114. For example, the dielectric constant for state of the art coaxial cable dielectric spacers may be about 1.25, whereas glass optical fibers may have a dielectric constant of for example, about 3.8. In contrast, plastic core optical fibers may have a dielectric constant of, for example, about 2.4-3.0, which is significantly closer to the dielectric constant of the dielectric spacer. Thus, in some embodiments, through the use of non-glass core optical fibers such as, for example, plastic core optical fibers, the dielectric constant of the optical fiber may be no more than 2.4 times the dielectric constant of the dielectric spacer. Such a plastic optic fiber 132 may also be capable of withstanding increased bending related stresses and/or strains without damage.

By positioning the fiber optic component 130 directly next to the central conductor 112, the stresses and strains that are applied to the optical fiber 132 when the composite communications cable 100 is bent are reduced. These stresses and strains may be calculated based on the overall geometry of the composite communications cable 100. For example, for a composite communications cable 100 that has a central conductor 112 with a diameter of 1.0 millimeters (0.040 inches), an optical fiber 132 that has a core/cladding layer 134/136 with a diameter of 125 microns and an acrylate coating 138 having a diameter of 250 microns, and the overall outer diameter of the composite communications cable 100 is 7 millimeters (0.275 inches), the stress that will be applied to the optical fiber 132 if the cable 100 is bent to a radius that is ten (10) times the cable outside diameter, or in this case 2.75 inches (which is the maximum coaxial cable bend radius specified in the relevant industry standards document) is 0.9 percent. Optical fibers are commercially available that may readily handle this stress level without breaking or being damaged. In contrast, if the optical fiber 132 is moved to just inside of the electrical shield 118, then the stress that will be applied to the optical fiber 132 if the cable 100 is bent to a radius of 2.75 inches is 3.26%, which is outside of the acceptable range. As another example, for a composite communications cable that has a central conductor 112 with a diameter of 1.0 millimeters (0.040 inches), an optical fiber 132 that has a core/cladding layer 134/136 with a diameter of 125 microns, an acrylate coating 138 having a thickness of 250 microns and a tight buffer layer having a thickness of 900 microns (such that the composite communications cable has an overall outer diameter of 7 millimeters), the stress that will be applied to the optical fiber 132 if the cable is bent to a radius of 2.75 inches is 3.26 percent. Optical fibers are also commercially available that will handle this stress level without breaking or being damaged. In contrast, if the optical fiber 132 is moved to just inside of the electrical shield 118, then the stress that will be applied to the optical fiber 132 if the cable is bent is outside of the acceptable range. Thus, pursuant to embodiments of the present invention, the optical fiber 132 may be located in a position that will protect the optical fiber 132 from damage.

Figure 5:
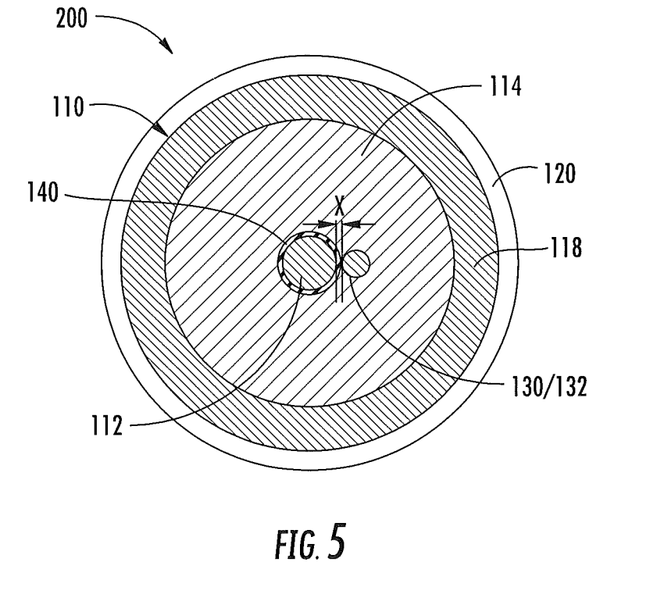
FIG. 5 is a transverse cross-sectional view of a composite communications cable according to further embodiments of the present invention.

FIG. 5 is a transverse cross-sectional view of a composite communications cable 200 according to further embodiments of the present invention. As shown in FIG. 5, the composite communications cable 200 includes a coaxial transmission component 110 that may be identical to the coaxial transmission component 110 that is described above, and may likewise include a fiber optic transmission component 130 that may be identical to the fiber optic transmission component 130 that is described above. Accordingly, further description of components 110 and 130 will be omitted. However, the composite communications cable 200 differs from the composite communications cable 100 in that in the composite communications cable 200 the fiber optic component 130 is spaced a small distance "x" from the central conductor 112 of the coaxial transmission component 110 as opposed to being directly adjacent to the central conductor 112 as is the case in the composite communications cable 100 of FIGS. 3 and 4.

In some embodiments of the composite communications cable 200, the outside surface of the optical fiber 132 may be no more than 50 microns from an outside surface of the central conductor 112. Thus, for a standard non-buffered optical fiber (which typically will have a diameter of less than about 300 microns), the central axis of the optical fiber 132 will be no more than 200 microns from an outer surface of the central conductor 112. As discussed above, by maintaining the optical fiber 132 very close to the central conductor 112, the stresses and strains that are imparted on the optical fiber 132 when the composite communications cable 200 is bent may be reduced.

In some embodiments, a release agent 140 may be coated on the central conductor 112 and/or on the outer surface of the optical fiber 132 in order to facilitate separating the optical fiber 132 from the central conductor 112 and/or the dielectric spacer 114 in the event that the composite communications cable 200 is later used as a fiber optic cable instead of as a coaxial cable. This release agent 140 may, in some embodiments, fill some or all of the space labeled "x" shown in FIG. 5 that exists between the optical fiber 132 and the central conductor 112. In other embodiments, a portion of the dielectric spacer 114 may be positioned between the outer surface of the central conductor 112 and the optical fiber 132. Other configurations are also possible.

In the embodiments of FIGS. 3-5, the optical fiber 132 runs longitudinally along the length of the composite communications cable parallel to the central conductor 112. Embodiments of the present invention, however, are not so limited.

Figure 6:
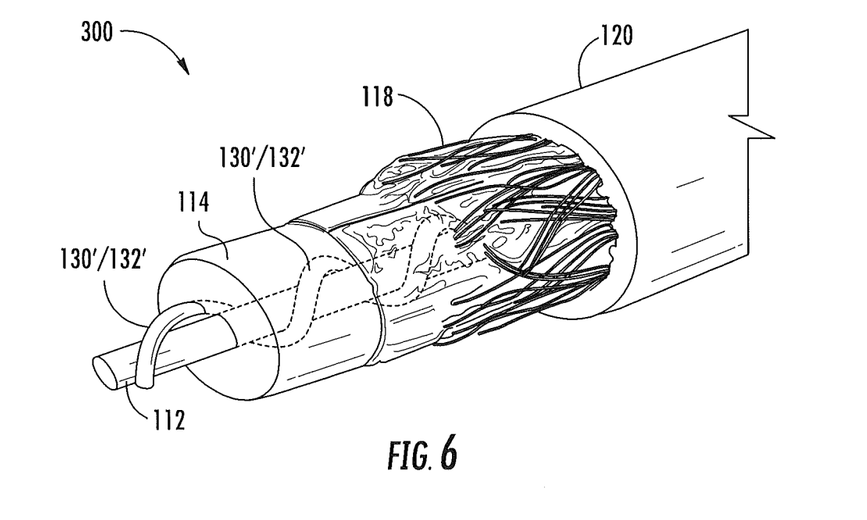
FIG. 6 is a perspective, partially cut-away view of a composite communications cable according to still further embodiments of the present invention.

For example, FIG. 6 is a perspective, partially cut-away view of a composite communications cable 300 according to still further embodiments of the present invention that includes a helically wound optical fiber transmission component 130'.

As shown in FIG. 6, the composite communications cable 300 includes a coaxial transmission component 110 that may be identical to the coaxial transmission component 110 of the composite communications cable 100 that is described above with reference to FIGS. 3-4. The composite communications cable 300 further includes a fiber optic transmission component 130' that includes a non-buffered optical fiber 132'. The non-buffered optical fiber 132' may be identical to the non-buffered optical fiber 132 of composite communications cable 100, except that the optical fiber 132' is helically wound about the central conductor 112. Such a helical winding may better balance the composite communications cable 300 and, to the extent that the optical fiber 132' does not adhere to the dielectric spacer 114 or the central conductor 112, may also allow more relative movement between the optical fiber 132' and the remaining components of composite communications cable 300, which facilitate reducing stresses and strains on the optical fiber 132'. In the embodiment depicted in FIG. 6, the optical fiber 132' is wound helically in the same direction about the central conductor 112 for the entire length of the cable 300. However, as shown by the call-out in FIG. 6, in other embodiments, the optical fiber 132' may be wound helically about the central conductor 112 in a first direction for a first segment of the cable 300 and then may be wound helically about the central conductor 112 in a second (opposite) direction for another segment of the cable 300 (i.e., the optical fiber 132' includes both clockwise helically wound sections and counterclockwise helically wound sections).

Figure 7:
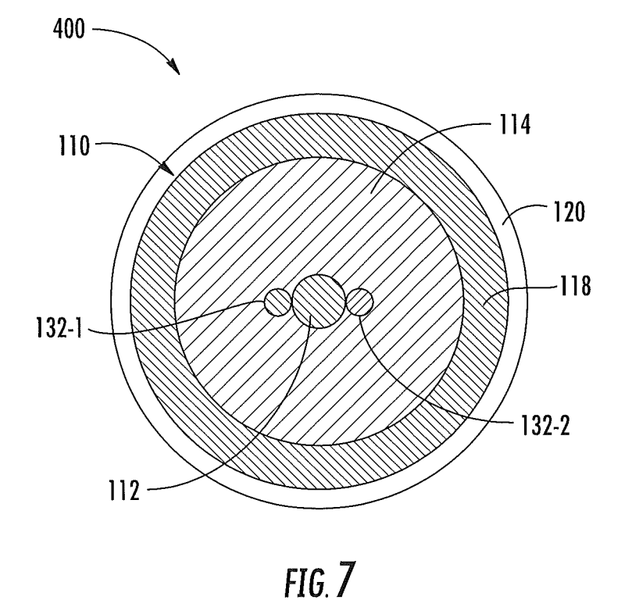
FIG. 7 is a transverse cross-sectional view of a composite communications cable according to yet additional embodiments of the present invention.

While the composite communications cables 100, 200 and 300 discussed above each only include a single optical fiber 132 or 132', it will be appreciated that more than one optical fiber may be provided. In particular, while a single optical fiber may provide sufficient bandwidth for many (but not all) fiber-to-the-home applications today, bandwidth requirements have tended to increase exponentially with time, and hence in the future far more applications may require multiple optical fibers. Additionally, the provision of a second optical fiber may provide redundancy in the event that one of the optical fibers is damaged, and can typically be included at a relatively modest increase in total cost. FIG. 7 is a perspective, partially cut-away view of a composite communications cable 400 according to embodiments of the present invention that includes a second optical fiber.

As shown in FIG. 7, the composite communications cable 400 includes a coaxial transmission component 110 that may be identical to the coaxial transmission component 110 of the composite communications cable 100 that is described above with reference to FIGS. 3-4. However, the fiber optic component 130' of the composite communications cable 400 includes both an optical fiber 132-1 and a second optical fiber 132-2. In some embodiments, the optical fibers 132-1 and 132-2 may be identical to each other and may, for example, be implemented using the non-buffered optical fibers 132 that are described above. In other embodiments, the optical fibers 132-1 and 132-2 may be different from each other. The optical fibers 132-1 and 132-2 may be positioned on opposite sides of the central conductor 112, although other positions are also possible. Moreover, while the embodiment of FIG. 7 illustrates a composite communications cable 400 that includes two optical fibers 132-1 and 132-2, it will be appreciated that in other embodiments more than two optical fibers may be provided. It will also be appreciated that the composite cables 200 and 300 discussed above may be modified to include more than one optical fiber 132.

Figure 8:
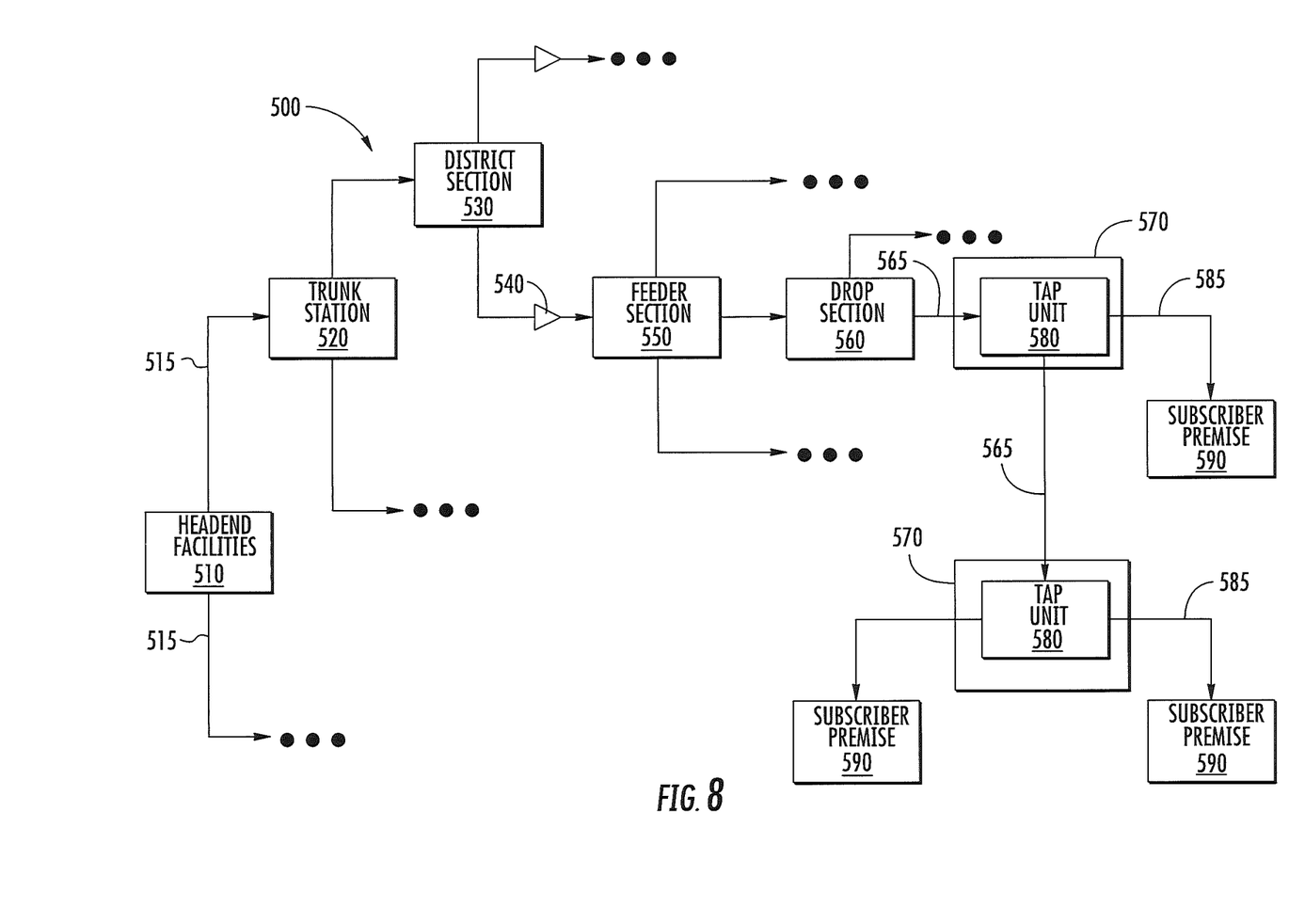
FIG. 8 is a schematic block diagram of a cable television network according to embodiments of the present invention.

FIG. 8 is a simplified, schematic block diagram of a cable television network 500 according to embodiments of the present invention. As shown in FIG. 8, the cable television network 500 includes headend facilities 510 where signals (e.g., broadcast and other signals) from various sources, such as transmissions from satellites, microwave, fiber optic and other sources, are gathered and processed for transmission over the cable television network 500. These signals are distributed via a main or "trunk" network 515 to trunk stations 520. The signals may be further distributed from each trunk station 520 to a plurality of district sections 530, where the signals are typically amplified by amplification units 540. Each district section 530 may feed a plurality of feeder sections 550. In many cable television networks, the signals that are passed between the headend facilities 510 and subscriber premises may be passed as optical signals over fiber optic cables through the trunk stations 520, the district sections 530 and the feeder sections 550.

Each feeder section 550 may feed a plurality of drop sections 560. In many cable television networks, optical network interface units may be provided in the drop sections 560 that convert downstream optical signals from the headend facilities 510 into electrical RF signals and that convert upstream RF signals from the subscriber premises into optical signals. Coaxial "drop" cables 565 are connected to the output of each drop section 560 and are routed through neighborhoods and the like, and a plurality of distribution and amplification systems 570 are provided that connect individual subscriber premises 590 to the cable television network 500. As shown in FIG. 8, each distribution and amplification system 570 includes a tap unit 580 that may provide connections to one or more subscriber premises 590. Typically, the tap units 580 are located outside near the subscriber premises 590 (i.e., on the outside of a building, in a cable box near the street, etc.). Drop cables 585 are provided that connect each subscriber premise 590 to a tap port on one of the tap units 580.

Pursuant to embodiments of the present invention, the drop cables 565 may be composite communications cables according to embodiments of the present invention. Coaxial connectors may be installed on each end of each drop cable 565 in order to allow the network side of each drop cable 565 to be connected to, for example, a coaxial connector provided on network equipment at the drop sections 560, and to allow the subscriber side of each drop cable 565 to be connected to, for example, a coaxial connector port on a tap unit 580. Likewise, the drop cables 585 that extend from the tap units 580 to the individual subscriber premises 590 may comprise composite communications cables according to embodiments of the present invention. Coaxial connectors may also be installed on each end of each drop cable 585 in order to allow the network side of each drop cable 585 to be connected to, for example, a coaxial connector tap port on a tap unit 580, and to allow the subscriber side of each drop cable 585 to be connected to, for example, a coaxial connector RF input port on a signal amplifier or other unit at a subscriber premise 590. The cable television network 500 may then be operated in a conventional manner as a hybrid fiber-coaxial network with RF (coaxial) connections from, for example, the drop sections 560 to the subscriber premises 590 using the coaxial transmission component of the composite communications cable.

As the cable television network 500 implements, for example, the drop cables 565 and 585 using composite communications cables according to embodiments of the present invention, it may be more easily upgraded at a later date to provide fiber-to-the-home functionality. To facilitate such a later upgrade of the cable television network 500, a slack loop that includes perhaps six to eighteen inches of excess cable may be provided on each end of the drop cables 565 and 585 during the installation process. When the cable television network 500 is to be upgraded to have fiber-to-the-home functionality, the coaxial connectors that are provided on each end of the cables 565 and 585 to be disconnected from the above-mentioned coaxial connector ports. The coaxial connectors may then be removed from each end of the drop cables 565, 585, and end portions of the cable jacket, electrical shield and dielectric spacer may be stripped back or removed from each end of the drop cables 565, 585 to expose the fiber optic communication element of these cables. In some embodiments, the central conductor of the drop cables may also be removed. The provision of the above-mentioned slack loops may provide excess cabling that allows a portion of each end of the drop cables 565, 585 to be removed or stripped back. Next, a plug termination may be installed on each end of the drop cables 565, 585. The plug termination may receive, for example, the fiber optic component, and may also receive the cable jacket and/or the central conductor. The plug termination may include, for example, at least one ferrule. Each optical fiber of the fiber optic component of the drop cables 565, 585 may be inserted in a respective ferrule of the plug termination to convert the drop cables 565, 585 into fiber optic patch cords 565', 585'. A network interface unit may be installed at the subscriber premises 590, and the network equipment in the drop sections 560 and the tap units 580 may be replaced with corresponding fiber optic equipment. The fiber optic patch cords 565', 585' may be connected to the above-described fiber optic apparatus to provide a fiber optic connection all the way from the head end facilities 510 to the subscriber premises 590. This fiber optic connection may support substantially more bandwidth than the coaxial cable connections that were originally provided to the subscriber premises 590.

Figure 9:
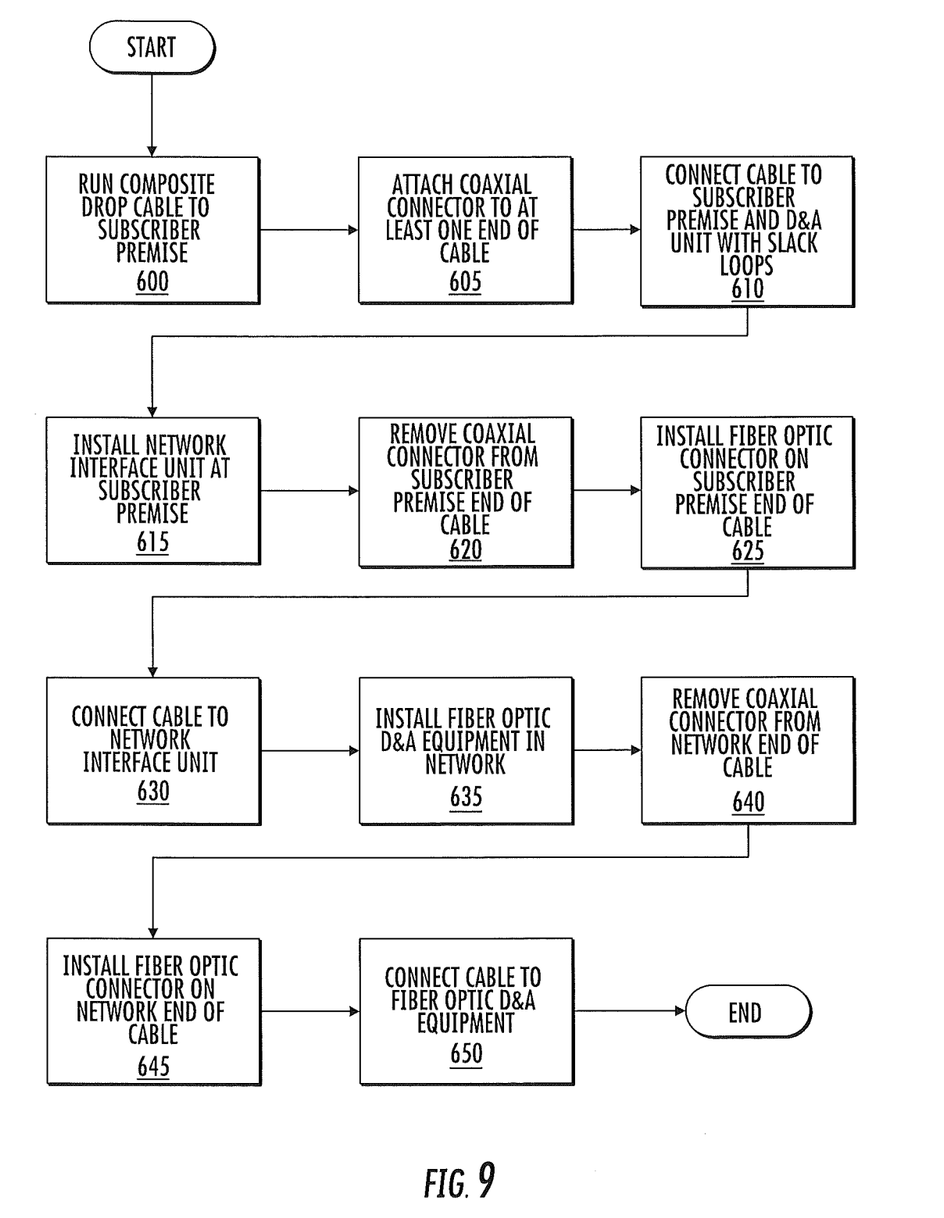
FIG. 9 is a flow chart illustrating a method of deploying and subsequently upgrading a communications network to have fiber-to-the-home functionality according to still further embodiments of the present invention.

According to further embodiments of the present invention, methods of deploying and later upgrading a cable television network are provided. FIG. 9 is a flow chart that illustrates one example of these methods. As shown in FIG. 9, according to these methods, a composite coaxial-fiber drop cable such as the cables according to embodiments of the present invention is run between a subscriber premise and a distribution and amplification unit of the network (block 600). The cable may be pre-cut or cut at the time of deployment to have sufficient length to include a slack loop at or near at least one end of the cable. A coaxial connector is mounted on at least one end of the composite cable (block 605). The composite cable may then be connected to apparatus at both the subscriber premise and the distribution and amplification unit to provide an electrical RF communications path between the distribution and amplification ("D&A") unit and the subscriber premise (block 610). During this connection process, a first slack loop may be formed in the composite cable at or near the subscriber premise and/or a second slack loop may be formed in the composite cable at or near the distribution and amplification unit.

Thereafter, the cable television network may be upgraded to provide fiber-to-the-home functionality. To accomplish this, a network interface unit may be installed at or near the subscriber premise and connected to equipment and/or cabling in the subscriber premises (block 615). A first coaxial connector may be removed from the end of the composite cable that connects to the subscriber premise, and various of the coaxial transmission components of this end of the composite cable may be stripped back to expose a segment of the fiber optic transmission component of the composite cable (block 620). A fiber optic termination may then be terminated onto the fiber optic transmission component (block 625), and the composite cable may then be connected to a fiber optic port on the network interface unit (block 630). Fiber optic distribution equipment (which may include amplification, if appropriate) may be installed in place of existing RF distribution and amplification equipment and connected to fiber optic connections of the cable television network (block 635). A second coaxial connector may be removed from the end of the composite cable that connects to the distribution and amplification equipment, and various of the coaxial transmission components of this end of the composite cable may be stripped back to expose a segment of the fiber optic transmission component of the composite cable (block 640). A fiber optic termination may then be terminated onto the fiber optic transmission component (block 645), and the composite cable may then be connected to a fiber optic port on the fiber optic distribution equipment (block 650). In this fashion, the cable television network 500 may be upgraded to implement fiber-to-the-home functionality without any need to install new drop cables.

In some embodiments of the present invention, the fiber optic distribution equipment that is discussed with respect to block 650 of FIG. 9 may be a network interface unit or a similar device that converts optical signals to electrical signals and/or splits the signal for distribution throughout a subscriber premise. When one of the composite communications cables disclosed herein such as, for example, cable 100 is converted from use as a coaxial cable to use as a fiber optic cable, the coaxial connector may be removed from the composite communications cable 100, and a tool which only cuts through the outer jacket 120, outer conductor 118 and a portion of the dielectric spacer 114 may then be used to access the optical fiber 132 without damaging the optical fiber 132. In some embodiments, this tool may be designed to cut the dielectric spacer 114 to a depth such that it is only "scored," and the scored section of the dielectric spacer 114 may then be manually manipulated to break it off without damaging the optical fiber 132. Steps may also be taken to protect the optical fiber 132 from the center conductor 112 such as, for example, removing the portion of the center conductor 112 that extends beyond the dielectric spacer 114, bending this portion of the center conductor 112 away from the optical fiber 132 or coating the exposed portion of the center conductor 112 to eliminate any possible mechanical degradation of the optical fiber 132 by the center conductor 112.

Once the subscriber premise side of the composite communications cable 100 has been prepared for use of the optical fiber 132 in, for example, the manner set forth above, the composite communications cable 100 may be routed into the interior of the network interface unit (e.g., through a grommet in a sidewall of the unit). A strain relief mechanism may be provided in the interior of the network interface unit, and the composite communications cable 100 may be connected to the strain relief mechanism. The exposed optical fiber 132 may then be placed within a furcation tube that protects the optical fiber 132. A pigtail connector may be provided that comprises, for example a tightly-buffered optical fiber that has a male connector mounted on one end thereof. A fusion splicer may then be used to align the exposed end of the optical fiber 132 to the exposed end of the tightly-buffered optical fiber on the pigtail connector and to then fuse the two together. The male connector on the pigtail may then be plugged into a female optical fiber connector port that is within the network interface unit to optically connect the optical fiber 132 to optical equipment within the network interface unit. A similar process may be used to convert the other end of the composite communications cable 100 (i.e., the end that was previously connected to, for example, a tap unit) from use as a coaxial cable to a use as a fiber optic cable. Typically, the optical equipment that the composite communications cable 100 will be connected to at the tap unit will comprise passive equipment as opposed to the network interface unit that is provided at the subscriber premise.

Figure 10:
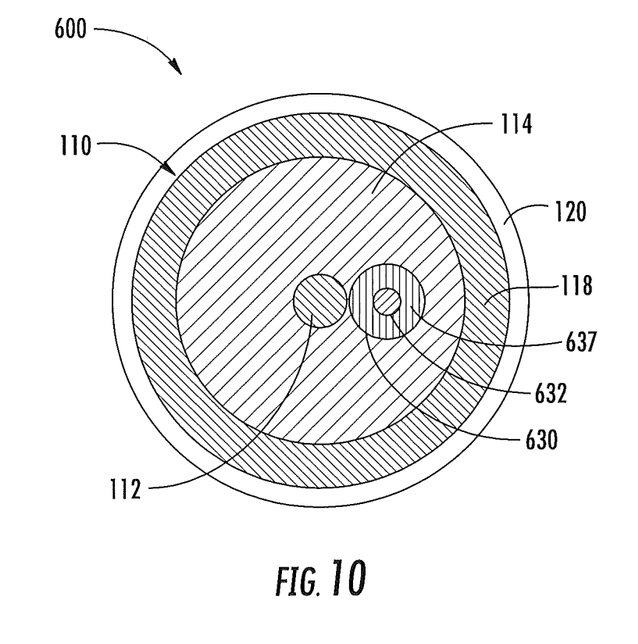
FIG. 10 is a transverse cross-sectional view of a composite communications cable that includes a tightly buffered optical fiber according to yet additional embodiments of the present invention.

FIG. 10 is a transverse, cross-sectional view of a composite communications cable 600 according to still further embodiments of the present invention. As shown in FIG. 10, the composite communications cable 600 includes a coaxial transmission component 110 that may be identical to the coaxial transmission component 110 of the composite communications cable 100 that is described above with reference to FIGS. 3-4. The composite communications cable 600 further includes a fiber optic transmission component 630 that includes a tightly-buffered optical fiber 632. The tightly-buffered optical fiber 632 has a central core, a cladding layer concentrically surrounding the core, a polymer layer concentrically surrounding the cladding layer, and an outer plastic layer 637 concentrically surrounding the polymer layer and joined to the polymer layer. The tightly-buffered optical fiber 632 is larger than the non-buffered optical fibers depicted in the embodiments of the present invention discussed above.

In some embodiments, a central axis of the optical fiber 632 may be within 450 microns of an outer surface of the central conductor 112. An outer surface of the tightly-buffered optical fiber 632 may be within 50 microns of the outer surface of the central conductor 112 and, in some embodiments, may directly contact an outside surface of the central conductor. The core of the tightly-buffered optical fiber 632 may be, for example, a glass core or a plastic core.

It will be appreciated that many modifications may be made to the exemplary embodiments of the present invention described above without departing from the scope of the present invention. It will likewise be appreciated that the features and components of the various embodiments described above may be further mixed and matched to provide yet additional embodiments of the present invention.

In the drawings, the size and/or relative positions of lines and elements may be exaggerated for clarity. It will also be understood that when an element is referred to as being "coupled," "connected," or "attached" to another element, it can be coupled, connected or attached directly to the other element, or intervening elements may also be present. In contrast, when an element is referred to as being "directly coupled" "directly connected," or "directly attached" to another element, there are no intervening elements present.

Unless otherwise defined, all technical and scientific terms used herein have the same meaning as commonly understood by one of ordinary skill in the art to which this invention belongs. The terminology used in the description herein is for the purpose of describing particular embodiments only and is not intended to be limiting of the invention. As used in the description and the appended claims, the singular forms "a", "an" and "the" are intended to include the plural forms as well, unless the context clearly indicates otherwise. As used herein, the term "and/or" includes any and all combinations of one or more of the associated listed items.

This invention is directed, in part, to composite communications cables. As used herein, the term "longitudinal" and derivatives thereof refer to the lengthwise direction defined by the central axis of the cable when the cable is pulled taunt in a straight line. Herein, the terms "transverse plane" and "transverse cross-section" refer to a plane and cross-section, respectively, that are taken normal to the longitudinal direction.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A composite communications cable, comprising:
a central conductor;
a dielectric spacer that substantially surrounds the central conductor;
an outer conductor that substantially surrounds the dielectric spacer;
a jacket that surrounds the outer conductor; and
a non-buffered optical fiber positioned between the central conductor and the dielectric spacer,
wherein an outer surface of the non-buffered optical fiber is within 50 microns of the outer surface of the central conductor.

2. The composite communications cable of claim 1, wherein the non-buffered optical fiber directly contacts an outside surface of the central conductor.

3. The composite communications cable of claim 2, wherein the non-buffered optical fiber extends parallel to the central conductor.

4. The composite communications cable of claim 1, wherein the non-buffered optical fiber is helically wound around the central conductor.

5. The composite communications cable of claim 1, wherein the non-buffered optical fiber is helically wound around the central conductor and includes both clockwise wound and counterclockwise wound sections.

6. The composite communications cable of claim 1, wherein the non-buffered optical fiber comprises a plastic non-buffered optical fiber.

7. The composite communications cable of claim 1, wherein a first dielectric constant of the non-buffered optical fiber is no more than 2.4 times greater than a second dielectric constant of the dielectric spacer.

8. The composite communications cable of claim 1, further comprising a stripping agent that is between the central conductor and the non-buffered optical fiber.

9. The composite communications cable of claim 1, wherein a central axis of the non-buffered optical fiber is within 200 microns of an outer surface of the central conductor.

10. The composite communications cable of claim 3, further comprising a coaxial connector on at least one end of the composite communications cable, the coaxial connector covering and blocking access to an end of the non-buffered optical fiber.

11. The composite communications cable of claim 3, wherein the non-buffered optical fiber comprises a first non-buffered optical fiber, the composite communications cable further comprising a second non-buffered optical fiber positioned between the central conductor and the dielectric spacer, wherein an outer surface of the second non-buffered optical fiber is within 50 microns of the outer surface of the central conductor.

12. A composite communications cable, comprising:
a coaxial transmission component that includes a central conductor, an outer conductor that electrically shields the central conductor, and a dielectric spacer between the central conductor and the outer conductor, the coaxial transmission component having a characteristic impedance of about 75 ohms;

a tightly-buffered optical fiber that has a central core, a cladding layer concentrically surrounding the core, a polymer layer concentrically surrounding the cladding layer, and an outer plastic layer concentrically surrounding the polymer layer and joined to the polymer layer; and a coaxial connector on at least one end of the composite communications cable, the coaxial connector covering and blocking access to an end of the tightly-buffered optical fiber, wherein a central axis of the optical fiber is within 450 microns of an outer surface of the central conductor.

13. The composite communications cable of claim 12, wherein an outer surface of the tightly-buffered optical fiber is within 50 microns of the outer surface of the central conductor.

14. The composite communications cable of claim 12, wherein the core of the tightly-buffered optical fiber comprises a plastic core.

15. The composite communications cable of claim 12, wherein the tightly-buffered optical fiber directly contacts an outside surface of the central conductor.

16. The composite communications cable of claim 12, wherein the tightly-buffered optical fiber is helically wound around the central conductor.

17. The composite communications cable of claim 12, further comprising a stripping agent that is between the central conductor and the tightly-buffered optical fiber.

18. The composite communications cable of claim 12, wherein the tightly-buffered optical fiber comprises a first tightly-buffered optical fiber, the composite communications cable further comprising a second tightly-buffered optical fiber positioned between the central conductor and the dielectric spacer, wherein an outer surface of the second tightly-buffered optical fiber is within 50 microns of the outer surface of the central conductor.

19. The composite communications cable of claim 12, in combination with a network interface unit that receives a first end of the composite communications cable and a signal amplifier that is coupled to the network interface unit, the signal amplifier located at a subscriber premise.

20. The composite communications cable of claim 1, wherein the dielectric spacer comprises a solid dielectric spacer.

21. The composite communications cable of claim 20, wherein the dielectric spacer has a circular cross section that includes a longitudinal channel running through a central portion thereof.

* * * * *